United States Patent
Uhlianuk et al.

(10) Patent No.: US 6,607,833 B1
(45) Date of Patent: Aug. 19, 2003

(54) HIGH SOLIDS ACID ETCH RESISTANT CLEAR COATING COMPOSITION

(75) Inventors: Peter William Uhlianuk, Romeo, MI (US); Ding-Yu Chung, Rochester Hills, MI (US); Isidor Hazan, Southfield, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/913,054

(22) PCT Filed: Mar. 16, 2000

(86) PCT No.: PCT/US00/06963

§ 371 (c)(1),
(2), (4) Date: Aug. 8, 2001

(87) PCT Pub. No.: WO00/55229

PCT Pub. Date: Sep. 21, 2000

Related U.S. Application Data

(60) Provisional application No. 60/124,850, filed on Mar. 17, 1999, and provisional application No. 60/175,728, filed on Jan. 1, 2000.

(51) Int. Cl.$^7$ ................................................ B32B 9/04

(52) U.S. Cl. ............... 428/447; 106/287.1; 106/287.16; 106/287.3; 106/311; 525/123; 528/17; 528/18; 528/23; 528/35; 528/45

(58) Field of Search ..................... 525/123; 427/387; 428/447; 528/17, 18, 38, 45, 254, 35, 23; 526/279; 106/287.1, 287.16, 287.3, 311

(56) References Cited

U.S. PATENT DOCUMENTS

| | | |
|---|---|---|
| 3,928,299 A | 12/1975 | Rosenkranz et al. |
| 3,954,900 A | 5/1976 | Schmalz et al. |
| 4,064,110 A | 12/1977 | Arlt et al. |
| 4,315,091 A | 2/1982 | Steinberger et al. |
| 4,403,086 A | 9/1983 | Holubka et al. |
| 4,440,937 A | 4/1984 | Krimm et al. |
| 4,499,150 A | 2/1985 | Dowbenko et al. |
| 4,533,716 A | 8/1985 | Okoshi et al. |
| 4,632,964 A | 12/1986 | Altschuler et al. |
| 4,760,108 A | 7/1988 | Asano et al. |
| 4,772,666 A | 9/1988 | Just et al. |
| 4,820,830 A | 4/1989 | Blank |
| 4,849,480 A | 7/1989 | Antonelli et al. |
| 4,960,828 A | 10/1990 | Higuchi et al. |
| 5,010,140 A | 4/1991 | Antonelli et al. |
| 5,051,473 A | 9/1991 | Tabuchi et al. |
| 5,059,670 A | 10/1991 | Harris |
| 5,169,719 A | 12/1992 | Balatan |
| 5,182,174 A | 1/1993 | Stephenson |
| 5,230,962 A | 7/1993 | Stephenson |
| 5,279,862 A | 1/1994 | Corcoran et al. |
| 5,281,443 A | 1/1994 | Briggs et al. |
| 5,336,566 A | 8/1994 | Rehfuss |
| 5,356,669 A | 10/1994 | Rehfuss et al. |
| 5,373,069 A | 12/1994 | Rehfuss et al. |
| 5,446,110 A | 8/1995 | Nakano et al. |
| 5,510,443 A | 4/1996 | Shaffer et al. |
| 5,512,639 A | 4/1996 | Rehfuss et al. |
| 5,646,213 A | 7/1997 | Guo |
| 5,665,433 A | 9/1997 | Moussa et al. |
| 5,684,084 A | 11/1997 | Lewin et al. |
| 5,719,237 A | 2/1998 | Rehfuss et al. |
| 5,726,246 A | 3/1998 | Rehfuss et al. |
| 5,744,550 A | 4/1998 | Menovcik et al. |
| 5,747,590 A | 5/1998 | Corcoran et al. |
| 5,760,127 A | 6/1998 | Bammel et al. |
| 5,763,528 A | 6/1998 | Barsotti et al. |
| 5,837,795 A | 11/1998 | Lomoelder et al. |
| 5,853,809 A | 12/1998 | Campbell et al. |
| 5,872,195 A | 2/1999 | Green et al. |
| 5,886,125 A * | 3/1999 | Huybrechts .................. 524/534 |
| 5,891,981 A | 4/1999 | Mauer et al. |
| 5,965,272 A * | 10/1999 | Donnelly et al. ........... 428/447 |
| 6,013,326 A | 1/2000 | Flosbach et al. |
| 6,143,367 A | 11/2000 | Bartol et al. |
| 6,221,494 B1 | 4/2001 | Barsotti et al. |
| 6,235,858 B1 | 5/2001 | Swarup et al. |

FOREIGN PATENT DOCUMENTS

| | | | |
|---|---|---|---|
| DE | 4124688 A1 | 1/1993 | |
| DE | 19529124 | 11/1996 | |
| EP | 017187 A1 | 10/1980 | |
| EP | 0135741 B1 | 4/1985 | |
| EP | 0179281 A1 | 4/1986 | |
| EP | 0272664 A2 | 6/1988 | |
| EP | 0562577 | 9/1993 | |
| EP | 708159 A2 | 4/1996 | |
| FR | 2265828 A | 10/1975 | |
| FR | 2392090 | 12/1978 | |
| JP | 02064120 A * | 3/1990 | ........... C08G/18/62 |
| JP | 06256714 | 9/1994 | |
| JP | 07233348 | 9/1995 | |

(List continued on next page.)

OTHER PUBLICATIONS

Yasushi Nakate, Sep. 6, 1978, High–Solid Urethane Coating Compositions, JP53 102332 Translation (XP–002143021, 6001 Chemical Abstract vol. 90 (1979) No. 2, pp. 78).

(List continued on next page.)

*Primary Examiner*—Robert Dawson
*Assistant Examiner*—Marc S Zimmer
(74) *Attorney, Agent, or Firm*—Sudhir G. Deshmukh

(57) ABSTRACT

The present invention provides for an etch and mar resistant low VOC clear coating composition most suitable for use as a top clear coat in multi-layered OEM or refinish automative coatings. The coating composition includes isocyanate, silane and melamine components. The isocyanate component includes an aliphatic polyisocyanate. The composition may be formulated as a two-pack or one-pack coating composition, wherein the isocyanante functionalities are blocked with a blocker such as a mono-alcohol.

36 Claims, No Drawings

FOREIGN PATENT DOCUMENTS

| | | | | |
|---|---|---|---|---|
| JP | 08120239 A | * | 5/1996 | .......... C09J/133/08 |
| WO | 0257848 A2 | | 3/1988 | |
| WO | WO 9625466 A1 | | 8/1996 | |
| WO | WO 9634905 A | | 11/1996 | |
| WO | WO 9722647 A1 | | 6/1997 | |
| WO | WO 9827134 A1 | | 6/1998 | |
| WO | WO 9919411 A | | 4/1999 | |

OTHER PUBLICATIONS

This technique is described in Chapter 3, pp. 48–61, entitled Uses and Abuses of Photon Correlation Spectroscopy in Particle Sizing by Weiner et al. 1987 edition of American Chemical Society Symposium series.

Kansai Patin, Derwent Publications Ltd., London, Coating Composition for Cars, Oct. 19, 1993, JP 05 271608 A, XP002143388 Abstract.

Ntsihlele et al, 1995, Journal of Applied Polymer Science, Cross–Linked Coatings by Co–Reaction of Isocyanate-Methoxymethyl Melamine System, vol. 55, No. 2, pp. 153–161.

Nippon Paint Co Ltd, Japanese Patent No. JP10045867, Feb. 17, 1998, Abstract.

Copy of the Notification of Transmittal of the International Search Report or the Declaration & Prior Art Citied Enclosed.

* cited by examiner

HIGH SOLIDS ACID ETCH RESISTANT CLEAR COATING COMPOSITION

CROSS-REFERENCE TO PARENT APPLICATIONS

This application is a 35 U.S.C. §371 of PCT/US00/06963 filed on Mar. 16, 2000, which claims benefit of provisional Application Serial Nos. 60/124,850, filed Mar. 17, 1999 and No. 60/175,728, filed Jan. 1, 2000.

BACKGROUND OF THE INVENTION

The present invention generally relates to high solids, low VOC (volatile organic component) coating compositions and more particularly to low VOC clear coating compositions suited for multi-layered coatings used in automotive OEM and refinish applications.

Basecoat-clearcoat systems have found wide acceptance in the automotive finishes market. Continuing effort has been directed to improve the overall appearance, the clarity of the topcoat, and the resistance to deterioration of these coating systems at ever-higher application solids levels. Further effort has also been directed to the development of coating compositions having low VOC. A continuing need still exists for clear coating formulations having an outstanding balance of performance characteristics after application, particularly gloss and distinctness of image (DOI) at high solids levels. Melamine/acrylic polyol crosslinked or melamine self-condensed coatings for example, may provide coatings having acceptable mar but such coatings have poor acid etch resistance and decreased appearance at higher solids levels. On the other hand, isocyanate/acrylic polyol based 2K urethane coatings generally provide acceptable acid-etch resistance but such coatings have poor mar resistance. Therefore, a need still exists for coatings that not only provide acceptable mar and acid-etch resistance but also high gloss and DOI at the lowest VOC possible.

One approach described by Ntsihlele and Pizzi in an article titled "Cross-Linked Coatings by Co-Reaction of Isocyanate-Methoxymethyl Melamine System" (Journal of Applied Polymer Science, Volume 55, Pages 153–161-1995) provides for reacting aromatic diisocyanate with methoxymethyl melamine. However, a need still exists for a high solids clear coating composition, which upon a long-term exposure to sunlight does not yellow or become brittle and provides high gloss and DOI.

Another approach described in a commonly assigned WO-A-96/25466 is directed to a coating composition that includes a component having at least two acid groups, a polymer having both epoxy and silane functionality and an acrylic core polymer having stabilizer components soluble in solvent used in the coating composition.

Yet another approach described in U.S. Pat. No. 4,315,091 is directed to coating compositions suitable for coating delicate substrate, such as polycarbonate, that can be readily attacked by organic solvents. The composition contains a partially hydroxyzed siloxane compound.

STATEMENT OF THE INVENTION

The present invention is directed to a clear coating composition comprising isocyanate, silane and melamine components wherein said isocyanate component comprises an aliphatic polyisocyanate having on an average 2 to 6 isocyanate functionalities.

The present invention is also directed to a method of producing a clear coating on a substrate comprising:

applying a layer of a clear coating composition comprising isocyanate, silane and melamine components wherein said isocyanate component comprises an aliphatic polyisocyanate having on an average 2 to 6 isocyanate functionalities; and curing said layer into said clear coating.

One of the advantages of the present invention is its low VOC, which is below the current guidelines of Environment Protection Agency (EPA) of the United States.

Another advantage is the mar and etch resistance and hardness of the coating resulting from the coating composition of the present invention.

Yet another advantage is the clarity and high gloss of the coating resulting from the coating composition of the present invention. As used herein:

"Two-pack coating composition" means a thermoset coating composition comprising two components stored in separate containers. These containers are typically sealed to increase the shelf life of the components of the coating composition. The components are mixed prior to use to form a pot mix. The pot mix has a limited pot life typically a few minutes (15 minutes to 45 minutes) to a few hours (4 hours to 6 hours). The pot mix is applied as a layer of desired thickness on a substrate surface, such as an autobody. After application, the layer is cured under ambient conditions or bake cured at elevated temperatures to form a coating on the substrate surface having desired coating properties, such as high gloss, mar-resistance and resistance to environmental etching.

"One-pack coating composition" means a thermoset coating composition comprising two components that are stored in the same container. However, one component is blocked to prevent premature crosslinking. After the application of the one-pack coating composition on a substrate, the layer is typically exposed to elevated temperatures to unmask the blocked component. Thereafter, the layer is bake-cured at elevated temperatures to form a coating on the substrate surface having desired coating properties, such as high gloss, mar-resistance and resistance to environmental etching.

"Low VOC coating composition" means a coating composition that includes in the range of from 0 to 0.472 kilogram of organic solvent per liter (4 pounds per gallon), preferably in the range of from 0.118 (1 pound per gallon) to 0.178 kilogram of organic solvent per liter (1.5 pounds per gallon) of the composition, as determined under the procedure provided in ASTM D3960.

"High solids composition" means a coating composition having a solid component in the range of from 65 to 100 percent and preferably greater than 70 percent, all in weight percentages based on the total weight of the composition.

"Clear coating composition" means a clear coating composition that produces upon cure, a clear coating having DOI (distinctness of image) rating of more than 80 and 20° gloss rating of more than 80.

"GPC weight average molecular weight" and "GPC number average molecular weight" means a weight average molecular weight and a weight average molecular weight, respectively measured by utilizing gel permeation chromatography. A high performance liquid chromatograph (HPLC) supplied by Hewlett-Packard; Palo Alto, Calif. was used. Unless stated otherwise, the liquid phase used was tetrahydrofuran and the standard was polymethyl methacrylate.

"Polymer particle size" means the diameter of the polymer particles measured by using a Brookhaven Model BI-90 Particle Sizer supplied by Brookhaven Instruments Corporation, Holtsville, N.Y. The sizer employs a quasi-elastic light scattering technique to measure the size of the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. 1987 edition of American Chemical Society Symposium series.

"Polymer solids" or "composition solids" means a polymer or composition in its dry state.

"Aliphatic" as employed herein includes aliphatic and cycloaliphatic materials.

"Crosslinkable" means that the individual components of an adduct contain functionalities which react within the composition of the invention to give a coating of good appearance, durability, hardness and mar resistance.

"Acid etch resistance" refers to the resistance provided by a coated surface against chemical etching action by the environment, such as for example acid rain.

"Mar resistance" refers to the resistance provided by coating to mechanical abrasions, such as, for example, the abrasion of a coated surface, such as an automotive body, that typically occurs during washing and cleaning of the coated surface.

Applicants have unexpectedly discovered that contrary to conventional approaches used in typical thermoset coating compositions, i.e., those involving polymers and crosslinking components, a very viable route lies in a combination of what would traditionally be considered as crosslinking agents for producing a unique low VOC high solids clear coating composition that produces coatings having superior coating properties, such as clarity, and mar and etch resistance. Applicants have further unexpectedly discovered that by including a silane component in a clear coating composition, the solids level can be further increased without sacrificing the etch and mar resistance, gloss, DOI, and other desired coating properties. It is believed that the silane component acts as a substitute for a solvent typically used in a coating composition and reacts upon cure to generate a stable and durable crosslinking structure. Thus, the viscosity of the resulting coating composition can be substantially lowered without sacrificing coating properties.

The clear coating composition includes isocyanate, silane and melamine components. The isocyanate component includes an aliphatic polyisocyanate having on an average 2 to 6, preferably 2.5 to 6 and more preferably 3 to 4 isocyanate functionalities. The coating composition includes in the range of from 35 percent to 70 percent, preferably in the range of from 40 percent to 60 percent, and most preferably in the range of 45 percent to 55 percent of the aliphatic polyisocyanate, the percentages being in weight percentages based on the total weight of composition solids.

Examples of suitable aliphatic polyisocyanates include aliphatic or cycloaliphatic di-, tri- or tetra-isocyanates, which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega -dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane 4,4'-diisocyanate, meta-tetramethylxylylene diisocyanate, polyisocyanates having isocyanurate structural units such as the isocyanurate of hexamethylene diisocyanate and isocyanurate of isophorone diisocyanate, the adduct of 2 molecules of a diisocyanate, such as hexamethylene diisocyanate, uretidiones of hexamethylene diisocyanate, uretidiones of isophorone diisocyanate or isophorone diisocyanate, and a diol such as ethylene glycol, the adduct of 3 molecules of hexamethylene diisocyanate and 1 molecule of water (available under the trademark Desmodur® N of Bayer Corporation, Pittsburgh, Pa.).

Aromatic polyisocyanates are not suitable for use in the present invention as the clear coatings resulting therefrom are too light sensitive and tend to yellow with age and crack upon long term exposure to sunlight. As a result such clear coatings are not durable.

If desired, the isocyanate functionalities of the polymeric isocyanate may be capped with a monomeric alcohol to prevent premature crosslinking in a one-pack composition. Some suitable monomeric alcohols include methanol, ethanol, propanol, butanol, isopropanol, isobutanol, hexanol, 2-ethylhexanol and cyclohexanol.

The melamine component of the coating composition includes suitable monomeric or polymeric melamines or a combination thereof. Alkoxy monomeric melamines are preferred. The coating composition includes in the range of from 10 percent to 40 percent, preferably in the range of from 15 percent to 35 percent, and most preferably in the range of from of 20 percent to 30 percent of the melamine, the percentages being in weight percentages based on the total weight of composition solids.

In the context of the present invention, the term "alkoxy monomeric melamine" means a low molecular weight melamine which contains, on an average three or more methylol groups etherized with a $C_{1\ to\ 5}$ monohydric alcohol such as methanol, n-butanol, or isobutanol per triazine nucleus, and has an average degree of condensation up to about 2 and preferably in the range of about 1.1 to about 1.8, and has a proportion of mononuclear species not less than about 50 percent by weight. The polymeric melamines have an average degree of condensation of more than 1.9

Some of such suitable monomeric melamines include highly alkylated melamines, such as methylated, butylated, isobutylated melamines and mixtures thereof. More particularly hexamethylol melamine, trimethylol melamine, partially methylated hexamethylol melamine, and pentamethoxymethyl melamine are preferred. Hexamethylol melamine and partially methylated hexamethylol melamine are more preferred and hexamethylol melamine is most preferred.

Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327 and 370, which are all monomeric melamines. Suitable polymeric melamines include high amino (partially alkylated, —N, —H) melamine known as Resimene™ BMP5503 (molecular weight 690, polydispersity of 1.98, 56% buytl, 44% amino), which is supplied by Solutia Inc., St. Louis, Mo., or Cymel® 1158 provided by Cytec Industries Inc., West Patterson, N.J.

Cytec Industries Inc. also supplies Cymel® 1130 @ 80 percent solids (degree of polymerization of 2.5), Cymel® 1133 (48% methyl, 4% methylol and 48% butyl), both of which are polymeric melamines.

The coating composition preferably includes one or more catalysts to enhance crosslinking of the components on curing. Generally, the coating composition includes in the range of from 0.1 percent to 5 percent, preferably in the range of from 0.1 to 2 percent, more preferably in the range of from 0.5 percent to 2 percent and most preferably in the range of from 0.5 percent to 1.2 percent of the catalyst, the percentages being in weight percentages based on the total weight of composition solids.

Some of the suitable catalysts include the conventional acid catalysts, such as aromatic sulfonic acids, for example dodecylbenzene sulfonic acid, para-toluenesulfonic acid and dinonylnaphthalene sulfonic acid, all of which are either unblocked or blocked with an amine, such as dimethyl oxazolidine and 2-amino-2-methyl-1-propanol, n,n-dimethylethanolamine or a combination thereof. Other acid catalysts that can be used are strong acids, such as phosphoric acids, more particularly phenyl acid phosphate, which may be unblocked or blocked with an amine.

In addition to the foregoing, the coating composition preferably includes a small amount of one or more organo tin catalysts, such as dibutyl tin dilaurate, dibutyl tin diacetate, stannous octate, and dibutyl tin oxide. Dibutyl tin dilaurate is preferred. The amount of organo tin catalyst added generally ranges from 0.001 percent to 0.5 percent, preferably from 0.05 percent to 0.2 percent and more preferably from 0.1 percent to 0.15 percent, the percentages being in weight percentages based on the total weight of composition solids.

These catalysts are preferably added to the melamine component.

The silane component of the coating composition generally includes a polymer provided with at least one reactive silane group. The coating composition includes in the range of from 5 percent to 45 percent, preferably in the range of from 10 percent to 40 percent, and most preferably in the range of from 15 percent to 35 percent of the silane component, the percentages being in weight percentages based on the total weight of composition solids.

The silane polymers suitable for use in the present invention have weight average molecular weight in the range of about 100 to 30,000, preferably in the range of about 120 to 25,000 and more preferably in the range of about 150 to 7,500. All molecular weights disclosed herein are determined by gel permeation chromatography using a polystyrene standard.

The silane polymer suitable herein is a polymerization product of about 30 to 95%, preferably 40 to 60%, by weight of ethylenically unsaturated non-silane containing monomers and about 5 to 70%, preferably 40 to 60%, by weight of ethylenically unsaturated silane containing monomers, based on the weight of the silane polymer. Suitable ethylenically unsaturated non-silane containing monomers are alkyl acrylates, alkyl methacrylates and any mixtures thereof, where the alkyl groups have 1 to 12 carbon atoms, preferably 3 to 8 carbon atoms.

Suitable alkyl methacrylate monomers used to form the silane polymer include methyl methacrylate, ethyl methacrylate, propyl methacrylate, butyl methacrylate, isobutyl methylate, pentyl methacrylate, hexyl methacrylate, octyl methacrylate, nonyl methacrylate, and lauryl methacrylate. Similarly, suitable alkyl acrylate momomers include methyl acrylate, ethyl acrylate, propyl acrylate, butyl acrylate, isobutyl acrylate, pentyl acrylate, hexyl acrylate, octyl acrylate, nonyl acrylate, and lauryl acrylate. Cycloaliphatic methacrylates and acrylates also can be used, for example, such as trimethylcyclohexyl methacrylate, trimethylcyclohexyl acrylate, iso-butyl methacrylate, t-butyl cyclohexyl acrylate, or t-butyl cyclohexyl methacrylate. Aryl acrylate and aryl methacrylates, such as, for example benzyl acrylate and benzyl methacrylate can be also used. It is understood that combinations of the foregoing monomers are also suitable.

In addition to alkyl acrylates or methacrylates, other polymerizable non-silane-containing monomers, up to about 50% by weight of the polymer, can be used in the silane polymer for the purpose of achieving the desired properties such as hardness, appearance, and mar resistance. Exemplary of such other monomers are styrene, methyl styrene, acrylamide, acrylonitrile and methacylonitrile. Styrene may be used in the range of 0 to 50%, preferably 5% to 30% by weight of the silane polymer.

A suitable silane containing monomer useful in forming the silane polymer is an alkoxysilane having the following structural formula:

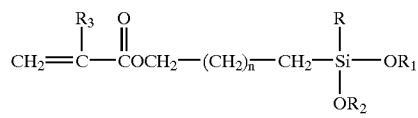

wherein R is either $CH_3$, $CH_3CH_2$, $CH_3O$, or $CH_3CH_2O$; $R_1$ and $R_2$ are $CH_3$ or $CH_3CH_2$; and $R_3$ is either H, $CH_3$, or $CH_3CH_2$; and n is 0 or a positive integer from 1 to 10, preferably from 1 to 4. Preferably, R is $CH_3O$ or $CH_3CH_2O$ and n is 1.

Typical examples of such alkoxysilanes are the acrylatoalkoxy silanes, such as gamma-acryloxypropyltrimethoxy silane and the methacrylatoalkoxy silanes, such as gamma-methacryloxypropyltrimethoxy silane, and gamma-methacryloxypropyltris(2-methoxyethoxy)silane.

Other suitable alkoxy silane monomers have the following structural formula:

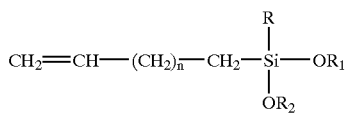

wherein R, $R_1$ and $R_2$ are as described above and n is a positive integer from 1 to 10, preferably from 1 to 4. Examples of such alkoxysilanes are the vinylalkoxy silanes, such as vinyltrimethoxy silane, vinyltriethoxy silane and vinyltris(2-methoxyethoxy)silane.

Other suitable silane containing monomers are acyloxysilanes, including acrylatoxy silane, methacrylatoxy silane and vinylacetoxy silanes, such as vinylmethyldiacetoxy silane, acrylatopropyltriacetoxy silane, and methacrylatopropyltriacetoxy silane. It is understood that combinations of the above-mentioned silane containing monomers are also suitable.

Consistent with the aforedescribed components of the silane polymer, one particular example of a silane polymer useful in the coating composition of this invention may contain the following constituents: about 15 to 25% by weight styrene, about 30 to 60% by weight methacryloxypropyltrimethoxy silane, and about 25 to 50% by weight trimethylcyclohexyl methacrylate.

One preferred silane polymer contains about 30% by weight styrene, about 50% by weight methacryloxypropyl trimethoxy silane, and about 20% by weight of nonfunctional acrylates or methacrylates such as trimethylcyclohexyl methacrylate, butyl acrylate, and iso-butyl methacrylate and any mixtures thereof.

Silane functional macromonomers also can be used in forming the silane polymer. These macromonomers are the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1 to 4, preferably 2 to 3 carbon atoms in the alkyl group and an isocyanatoalkyl alkoxysilane such as isocyanatopropyl triethoxysilane.

Typical of such above-mentioned silane functional macromonomers are those having the following structural formula:

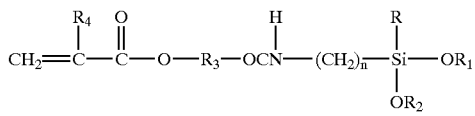

wherein R, R$_1$, and R$_2$ are as described above; R$_4$ is 1 or CH$_3$, R$_3$ is an alkylene group having 1 to 8, preferably 1 to 4 carbon atoms and n is a positive integer from 1 to 8, preferably from 1 to 4.

The coating composition of the present invention, which is formulated into high solids coating systems further contains at least one organic solvent typically selected from the group consisting of aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters, such as propylene glycol monomethyl ether acetate. The amount of organic solvent added depends upon the desired solids level as well as the desired amount of VOC of the composition. If desired, the organic solvent may be added to both components of the binder.

The coating composition of the present invention may also contain conventional additives such as stabilizers and rheology control agents, flow agents, and toughening agents. Such additional additives will, of course, depend on the intended use of the coating composition. Any additives that would adversely effect the clarity of the cured coating will not be included as the composition is used as a clear coating. The foregoing additives may be added to either component or both, depending upon the intended use of the coating composition.

The clear coating composition of the present invention may be supplied in the form of a two-pack coating composition in which the first-pack includes the polyisocyanate component and the second-pack includes the melamine component. Generally the first and the second pack are stored in separate containers and mixed before use. The containers are preferably sealed air tight to prevent degradation during storage. The mixing may be done, for example, in a mixing nozzle or in a container.

Alternatively, when the isocyanate functionalities of the polyisocyanate are blocked, both the components of the coating composition can be stored in the same container in the form of a one-pack coating composition.

To improve weatherability of the clear finish of the coating composition, about 0.1 to 5%, by weight, based on the weight of the composition solids, of an ultraviolet light stabilizer or a combination of ultraviolet light stabilizers and absorbers may be added. These stabilizers include ultraviolet light absorbers, screeners, quenchers and specific hindered amine light stabilizers. Also, about 0.1 to 5% by weight, based on the weight of the composition solids, of an antioxidant can be added. Typical ultraviolet light stabilizers that are useful include benzophenones, such as hydroxydodecyclbenzo-phenone, 2,4-dihydroxybenzophenone; triazoles, such as 2-phenyl-4-(2'-4'-dihydroxybenzoyl)triazoles; and triazines, such as 3,5-dialkyl-4-hydroxyphenyl derivatives of triazine and triazoles such as 2-(benzotriazole-2-yl)-4,6-bis (methylethyl-1-phenyl ethyl)phenol, 2-(3-hydroxy-3,5'-di-tert amyl phenyl)benzotriazole, 2-(3',5'-bis(1,1-dimethylpropyl)-2'-hydroxyphenyl)-2H-benzotriazole, benzenepropanoic acid, 3-(2H-benzotriazol-2-yl)-5-(1,1-dimethylethyl)-4-hydroxy-C$_{7-9}$-branched alkyl esters, and 2-(3',5'-bis(1-methyl-1-phenylethyl)-2'-hydroxyphenyl) benzotriazole.

Typical hindered amine light stabilizers are bis(2,2,6,6-tetramethylpiperidinyl)sebacate, bis(N-methyl-2,2,6,6-tetramethylpiperidinyl)sebacate and bis(N-octyloxy-2,2,6,6-tetramethylpiperidynyl)sebacate. One of the useful blends of ultraviolet light absorbers and hindered amine light stabilizers is bis(N-octyloxy-2,2,6,6-tetramethylpiperidynyl) sebacate and benzenepropanoic acid, 3-(2H-benzotriazol-2-yl)-5-(1,1-dimethylethyl)-4-hydroxy-,C7-9-branched alkyl esters. Another useful blend of ultraviolet light absorbers and hindered amine light stabilizers is 2-(3',5'-bis(1-methyl-1-phenylethyl)-2'-hydroxyphenyl)benzotriazole and decanedioc acid,bis(2,2,6,6,-tetramethyl-4-piperidinyl)ester both supplied by Ciba Specialty Chemicals, Tarrytown, N.Y. under the trademark Tinuvin® 900 and Tinuvin® 123, respectively.

The coating composition of the present invention optionally contains in the range of from 0.1 percent to 40 percent, preferably in the range of from 5 percent to 35 percent, and more preferably in the range of from 10 percent to 30 percent of a flow modifying resin, such as a non-aqueous dispersion (NAD), all percentages being based on the total weight of composition solids. The weight average molecular weight of the flow modifying resin generally varies in the range of from 20,000 to 100,000, preferably in the range of from 25,000 to 80,000 and more preferably in the range from 30,000 to 50,000.

The non-aqueous dispersion-type resin is prepared by dispersion-polymerizing at least one vinyl monomer in the presence of a polymer dispersion stabilizer and an organic solvent. The polymer dispersion stabilizer may be any of the known stabilizers used commonly in the field of non-aqueous dispersions, and may include the following substances (1) through (9) as examples:

(1) A polyester macromer having about 1.0 polymerizable double bond within the molecule as obtainable upon addition of glycidyl acrylate or glycidyl methacrylate to an auto-condensation polyester of a hydroxy-containing fatty acid such as 12-hydroxystearic acid.

(2) A comb-type polymer prepared by copolymerizing the polyester macromer mentioned under (1) with methyl methacrylate and/or other (meth)acrylic ester or a vinyl monomer.

(3) A polymer obtainable by the steps of copolymerizing the polymer described under (2) with a small amount of glycidyl(meth)acrylate and, then, adding (meth)acrylic acid to the glycidyl groups thereof so as to introduce double bonds.

(4) A hydroxy-containing acrylic copolymer prepared by copolymerizing at least 20 percent by weight of (meth) acrylic ester of a monohydric alcohol containing 4 or more carbon atoms.

(5) An acrylic copolymer obtainable by producing at least 0.3 double bond per molecule based on its number average molecular weight, into the copolymer mentioned under (4). A method for introducing double bonds may, for example, comprise copolymerizing the acrylic polymer with a small amount of glycidyl(meth) acrylate and then adding (meth)acrylic acid to the glycidyl group.

(6) An alkylmelamine resin with a high tolerance to mineral spirit.

(7) An alkyd resin with an oil length not less than 15 percent and/or a resin obtainable by introducing polymerizable double bonds into the alkyd resin. A method of introducing double bonds may, for example, comprise addition reaction of glycidyl(meth)acrylate to the carboxyl groups in the alkyd resin.

(8) An oil-free polyester resin with a high tolerance to mineral spirit, an alkyd resin with an oil length less than 15 percent, and/or a resin obtainable by introducing double bonds into said alkyd resin.

(9) A cellulose acetate butyrate into which polymerizable double bonds have been introduced. An exemplary method of introducing double bonds comprises addition reaction of isocyanatoethyl methacrylate to cellulose acetate butyrate.

These dispersion stabilizers can be used alone or in combination.

Among the aforementioned dispersion stabilizers, preferred for the purposes of the invention are those which can be dissolved in comparatively low polar solvents, such as aliphatic hydrocarbons to assure the film performance requirements to some extent. As dispersion stabilizers which can meet such conditions, the acrylic copolymers mentioned under (4) and (5) are desirable in that they not only lend themselves well to adjustment of molecular weight, glass transition temperature, polarity (polymer SP value), hydroxyl value, acid value and other parameters but are excellent in weatherability. More desirable are acrylic copolymers containing an average of about 0.2 to about 1.2 polymerizable double bonds, per molecule, which are graft copolymerized with dispersed particles.

The non-aqueous dispersion-type resin used in accordance with this invention can be easily prepared by dispersion-polymerizing at least one vinyl monomer in the presence of the aforedescribed polymer dispersion stabilizer and an organic solvent, which mainly contains an aliphatic hydrocarbon. The dispersion stabilizer and the vinyl monomer are soluble in the organic solvent. However, the polymer particles formed by the vinyl monomer are not soluble in the solvent.

The monomer component forming the acrylic copolymer suitable as the polymer dispersion stabilizer and the vinyl monomer forming the dispersed L particles may be virtually any radical-polymerizable unsaturated monomer. A variety of monomers can be utilized for the purpose. Typical examples of such monomers include the following.

(a) Esters of acrylic acid or methacrylic acid, such as for example, $C_{1-18}$ alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, octyl methacrylate, lauryl methacrylate, and stearyl methacrylate; glycidyl acrylate and glycidyl methacrylate; $C_{2-8}$ alkenyl esters of acrylic or methacrylic acid, such as alkyl acrylate, and alkyl methacrylate; $C_{2-8}$ hydroxyalkyl esters of acrylic or methacrylic acid, such as hydroxyethyl acrylate, hydroxyethyl methacrylate, hydroxypropyl acrylate, and hydroxypropyl methacrylate; and $C_{3-18}$ alkenyloxyalkyl esters or acrylic or methacrylic acid, such as alkyloxyethyl acrylate, and alkyloxyethyl methacrylate.

(b) Vinyl aromatic compounds, such as, for example, styrene, α-methylstyrene, vinyltoluene, p-chlorostyrene, and vinylpyridine.

(c) α,β-Ethylenically unsaturated acids, such as, for example, acrylic acid, methacrylic acid, itaconic acid and crotonic acid.

(d) Amides of acrylic or methacrylic acid, such as, for example, acrylamide, methacrylamide, n-butoxymethylacrylamide, N-methylolacrylamide, n-butoxymethylmethacrylamide, and N-methylolmethacrylamide.

(e) Others: for example, acrylonitrile, methacrylonitrile, methyl isopropenyl ketone, vinyl acetate, VeoVa monomer (product of Shell Chemicals, Co., Ltd.; mixed vinyl esters of a synthetic saturated monocarboxylic acid of highly branched structure containing ten carbon atoms), vinyl propionate, vinyl pivalate, isocyanatoethyl methacrylate, perfluorocyclohexyl(meth)acrylate, p-styrenesulfonamide, N-methyl-p-styrenesulfonamide, and γ-methacryloyloxypropyl trimethoxy silane.

Among the monomers mentioned above, the following materials can be used with particular advantage for the preparation of the acrylic copolymer used as a dispersion stabilizer:

Mixed monomers based on comparatively long-chain, low-polar monomers, such as n-butyl methacrylate, 2-ethylhexyl methacrylate, dodecyl methacrylate, lauryl methacrylate, and stearyl methacrylate, supplemented as necessary with styrene, methyl(meth)acrylate, ethyl(meth) acrylate, 2-hydroxyethyl(meth)acrylate, propyl(meth) acrylate, and (meth)acrylic acid. The dispersion stabilizer may be one prepared by adding glycidyl(meth)acrylate or isocyanatoethyl methacrylate to a copolymer of the monomers for introduction of polymerizable double bonds.

The acrylic copolymer used as the dispersion stabilizer can be easily prepared using a radical polymerization initiator in accordance with the known solution polymerization process.

The number average molecular weight of the dispersion stabilizer is preferably in the range of about 1,000 to about 50,000 and, for still better results, about 3,000 to about 20,000.

Among the monomers mentioned above, particularly preferred vinyl monomers for the formation of the dispersed polymer particles predominantly contain comparatively high-polarity monomers, such as methyl(meth)acrylate, ethyl(meth)acrylate, n-butyl(meth)acrylate, and acrylonitrile, supplemented as necessary with (meth)-acrylic acid, and 2-hydroxyethyl(meth)acrylate. It is also possible to provide gel particles as cross-linked in molecules by copolymerizing a small amount of polyfunctional monomers, such as divinylbenzene, and ethylene glycol dimethacrylate, by copolymerizing a plurality of monomers having mutually reactive functional groups, such as glycidyl methacrylate and methacrylic acid, or by copolymerizing an auto-reactive monomer, such as N-alkoxymethylated acrylamides, and γ-methacryloyloxypropyl trimethoxy silanes.

In conducting the dispersion polymerization, the ratio of the dispersion stabilizer to the vinyl monomer forming dispersed particles is selected from the range of about 5/95 to about 80/20 by weight, preferably about 10/90 to about 60/40 by weight, and the dispersion polymerization can be conducted in the presence of a radical polymerization initiator by a known procedure.

While the particle size of the resulting non-aqueous dispersion type acrylic resin is generally in the range of about 0.05 μm to about 2 μm, the range of about 0.1 μm to about 0.7 μm is preferable from the stability of shelf life and the gloss, smoothness and weatherability of the film.

In use, the first-pack of the two-pack coating composition containing the polyisocyanate and the second-pack containing the melamine and silane component are mixed just prior to use or about 5 to 30 minutes before use to form a pot mix, which has limited pot life of about 10 minutes to about 6 hours. Thereafter, it becomes too viscous to permit application through conventional application systems, such as spraying. A layer of the pot mix is typically applied to a substrate by conventional techniques, such as spraying, electrostatic spraying, roller coating, dipping or brushing. Generally, a clear coat layer having a thickness in the range of from 25 micrometers to 75 micrometers is applied over a metal substrate, such as automotive body, which is often pre-coated with other coating layers, such as an electrocoat, primer and a basecoat. The two pack coating composition may be baked upon application for about 60 to 10 minutes at about 80° C. to 160° C.

When the one-pack coating composition containing the blocked polyisocyanate is used, a layer thereof applied over a substrate using aforedescribed application techniques, is cured at a baking temperature in the range of from 80° C. to 200° C., preferably in the range of 80° C. to 160° C., for about 60 to 10 minutes. It is understood that actual baking temperature would vary depending upon the catalyst and the amount thereof, thickness of the layer being cured and the blocked isocyanate functionalities and the melamine utilized in the coating composition. The use of the foregoing baking step is particularly useful under OEM (Original Equipment Manufacture) conditions.

The clear coating composition of the present invention is suitable for providing clear coatings on variety of substrates, such as metal, wood and concrete substrates. The present composition is especially suitable for providing clear coatings in automotive OEM or refinish applications. These compositions are also suitable as clear coatings in industrial and maintenance coating applications.

The invention is illustrated in the following Examples:

EXAMPLES

Blocked Isocyanurate 1

A mixture of 500 parts of methyl amyl ketone, 1211 parts of 2 ethyl hexanol and 0.3 part of dibutyl tin dilaurate was heated to 60° C. under nitrogen blanket in a flask fitted with a mixer and a condenser. Then 1796 parts of isocyanurate of hexane diisocyanate (Desmodur® 3300 by Bayer Corporation) were added to the reaction mixture, which resulted in an exothermic reaction. The exothermal reaction was controlled by maintaining the reaction temperature at or below 100° C. Then 45 parts of methyl amyl ketone were added. The reaction mixture was held at 90° C. for 1 hour to yield 2 ethyl hexanol blocked isocyanurate of hexane diisocyanate.

Blocked Isocyanurate 2

A mixture of 1044 parts of methyl amyl ketone, 1746 parts of isocyanurate of hexane diisocyanate (Desmodur®3300 supplied by Bayer Corporation, Pittsburgh, Pa.), and 0.3 part of dibutyl tin dilaurate was heated to 80° C. under nitrogen blanket in a flask fitted with a mixer and a condenser. Then 902 parts of cyclohexanol were added to the reaction mixture over a period of 20 minutes, followed by the addition of 45 parts of methyl amyl ketone. The reaction mixture was held at 100° C. for 1.5 hour to yield cyclohexanol blocked isocyanurate of hexane diisocyanate.

Silane Polymer 1

In a flask fitted with a mixer and a condenser, 158 parts of aliphatic solvent were heated to reflux. A mixture of 140 parts of styrene, 140 parts of isobornyl methacrylate, 304 parts of methacryloxypropylrimethoxysilane (UCARSIL® A-174 by Witco), 82 parts of aliphatic solvent and 16 parts of tertiary butyl peracetate were added over a period of 240 minutes. The reaction mixture was held for 1 hour to yield a polymer containing methacryloxypropylrimethoxysilane.

Silane Polymer 2 (Silane Functional Polyurethane Polymer)

To a 5 liter reactor fitted with heating mantle, stirrer, and under nitrogen blanket, 1035.7 parts of Aromatic 100 solvent, 206.48 parts of propylene carbonate (supplied by Huntsman Corporation, Austin, Tex.), and 340.2 parts aminopropyl trimethoxy silane (supplied by OSI Corporation, Tarrytown, N.Y.) were charged. The reaction mixture was heated under agitation to 120° C., held 4 hours and then cooled to 100° C. A shot of 570.49 parts of cyclohexanol (supplied by Aldrich Chemical Company, Milwaukee, Wis.), 40 parts of Aromatic 100 solvent, and 0.3 parts of dibutyltin dilaurate catalyst (supplied by Air Products, Allentown, Pa.) was added. Thereafter, a polyisocyanate solution of 1472.7 parts of Desmodur® 3300 polyisocyanate (supplied by Bayer Corporation, Pittsburgh, Pa.) with 240 parts Aromatic 100 solvent. The rate of addition was adjusted to control the resulting exothermic reaction by maintaining the reaction temperature at 120° C. The reaction mixture was held at 120° C. for 3.8 hours at which point the isocyanate had been completely consumed as determined by the absence of the isocyanate absorbance at 2220 $cm^{-1}$ in the infrared spectrum. The resulting silane polymer had viscosity of 12,300 cps at 70.52% nv. It should be noted that absent the silane functionality the polymer would have viscosity three times the viscosity of the aforedescribed silane polymer.

The aforedescribed components along with the additional components described in Table 1 below were used to prepare clearcoat compositions of Example 1 of the present invention and Comparative Examples 1 and 2.

TABLE 1

Clearcoat Compositions

| | Comparative Example 1 | Comparative Example 2 | Example 1 |
|---|---|---|---|
| Monomeric melamine[1] | 32 | 32 | 32 |
| Blocked Isocyanurate 1 | | 58 | 37 |
| Blocked Isocyanurate 2 | 60 | | |
| Silane Polymer 1 | | | 28 |
| NAD[2] | 46 | 46 | 31 |
| HALS Tinuvin ® 123[3] | 2 | 2 | 2 |
| UVA Tinuvin ® 1130[4] | 2 | 2 | 2 |
| Catalyst 1[5] | 4.5 | 4.5 | 3.5 |
| Catalyst 2[6] | | | 0.1 |

[1]Cymel ® 1168 (methylated butylated melamine from Cytec Industries Inc., West Patterson, New York
[2]Prepared in accordance with the U.S. Pat. No. 5,747,590 at column 8, lines 46–68 and column 9, lines 1–25, all of which is incorporated herein by reference
[3]Supplied by Ciba Specialty Chemicals, Tarrytown, New York
[4]Supplied by Ciba Specialty Chemicals, Tarrytown, New York
[5]Phenyl acid phosphate salt of 2-amino-2-methyl-1-propanol supplied by King Industries, Norwalk, Connecticut
[6]Dibutyl tin dilaurate supplied by Air Product, Allentown, Pennsylvania Layers from clearcoat compositions from Example 1 and Comparative Examples 1 and 2 were spray applied wet-on-wet over a basecoat on a primed phosphated steel panels and then bake cured for 30 minutes at 140° C. to form coatings thereon. Applicants unexpected discovery of the dramatic improvement in the coating properties when the aforedescribed Silane Polymer 1 is added to the melamine/isocyanate components can be seen from the coating properties of Example 1 and Comparative Examples 1 and 2 measured and reported in Table 2 below:

TABLE 2

Properties

| Properties | Test Method | Comparative Example 1 | Comparative Example 2 | Example 1 |
|---|---|---|---|---|
| Dry film thickness | ASTM D1400 | 32 microns | 32 microns | 32 microns |
| 20° Gloss | ASTM D523 | 84 | 84 | 94 |
| DOI | ASTM D5767 | 83 | 80.2 | 92.3 |
| Tukon Hardness | ASTM D1474 | 6.2 | 14.1 | 14.1 |
| % Retention dry mar | ASTM D5178 | 80 | 92 | 98 |

TABLE 2-continued

| Properties | Test Method | Properties | | |
| --- | --- | --- | --- | --- |
| | | Comparative Example 1 | Comparative Example 2 | Example 1 |
| % Retention wet mar | ASTM D5178 | 92 | 81 | 86 |
| Acid etch | Jacksonville, Florida exposure for 3 months[1] | 8.33 | 6.17 | 5.5 |

[1]On a scale of 1 to 10 (1 being the best and 10 being the worst).

From the data reported in Table 2 it is readily apparent that the presence of silane polymer in the clearcoat composition substantially improves the appearance of the coating with substantially comparable or better acid etch and mar resistances and film hardness.

What is claimed is:

1. A clear coating composition comprising isocyanate, silane and melamine components wherein said isocyanate component comprises an aliphatic polyisocyanate having on an average 2 to 6 isocyanate functionalities, wherein a VOC of said composition varies in the range of from 0.0 to 0.472 kilogram of an organic solvent per liter of the composition wherein the composition comprises 35 percent to 70 percent of said aliphatic polyisocyanate and 10 percent to 40 percent of said melamine component, all the percentages being based on total weight of composition solids.

2. The composition of claim 1 wherein said isocyanate functionalities are blocked by reacting said functionalities with a monomeric alcohol.

3. The composition of claim 2 wherein said monomeric alcohol is an aliphatic alcohol.

4. The composition of claim 1 wherein said silane component comprises at least one silane polymer having one or more reactive silane group.

5. The composition of claim 1 or 2 wherein said composition further comprises one or more organo tin catalysts or acid catalysts.

6. The composition of claim 5 wherein said organo tin catalyst is selected from the group consisting of dibutyl tin diacetate, dibutyl tin dilaurate, stannous octate, and a combination thereof.

7. The composition of claim 5 wherein the acid catalyst is selected from the group consisting of dodecylbenzene sulfonic acid, dodecylbenzene sulfonic acid blocked with an amine, para-toluenesulfonic acid, para-toluenesulfonic acid blocked with an amine, phenyl acid phosphate, phenyl acid phosphate blocked with an amine dinonylnaphthalene sulfonic acid, dinonylnaphthalene sulfonic acid blocked with an amine and a combination thereof.

8. The composition of claim 7 wherein said amine is dimethyl oxazolidine, 2-amino-2-methyl-1-propanol, n,n-dimethylethanolamine or a combination thereof.

9. The composition of claim 5, 6 or 7 wherein said composition comprises in the range of from 0.001 percent to 5.0 percent of said catalyst, all percentages being weight percentages based on the total weight of composition solids.

10. The composition of claim 1 wherein said polyisocyanate comprises one or more trimers of hexamethylene diisocyanate, isophorone diisocyanate, meta-tetramethylxylylene diisocyanate, or a combination thereof.

11. The composition of claim 1 or 6 comprises in the range of from 35 percent to 70 percent said polyisocyanate wherein all percentages are in weight based on the total weight of composition solids.

12. The composition of claim 1, 2 or 10 wherein said polyisocyanate has an average 2.5 to 6 isocyanate functionalities.

13. The composition of claim 1 wherein said melamine component comprises a monomeric melamine, a polymeric melamine, or a combination thereof.

14. The composition of claim 1 or 13 comprises in the range of from 10 percent to 40 percent of said melamine component wherein all percentages are in weight based on the total weight of composition solids.

15. The composition of claim 1 further comprises a flow modifying resin.

16. The composition of claim 1 comprises in the range of from 5 percent to 45 percent of said silane component, all percentages being in weight percentages based on the total weight of composition solids.

17. The composition of claim 1 in the form of a two-pack composition wherein a first-pack of said two-pack composition comprises said polyisocyanate component and a second-pack of said two-pack composition comprises said melamine and silane components.

18. The clear coating composition of claim 1 wherein a clear coating on a substrate produced from said composition has a DOI rating of at least 80.

19. The composition of claim 1 further comprises ultra violet light stabilizers, light absorbers or a combination thereof.

20. The clear coating composition of claim 1 wherein said isocyanate component comprises 40 percent to 60 percent of said aliphatic polyisocyanate and 15 percent to 35 percent of said melamine component, all the percentages being based on total weight of composition solids.

21. The clear coating composition of claim 1 wherein said isocyanate component comprises 45 percent to 55 percent of said aliphatic polyisocyanate and 20 percent to 30 percent of said melamine component, all the percentages being based on total weight of composition solids.

22. A coating composition comprising isocyanate, silane and melamine components wherein said isocyanate component comprises an aliphatic polyisocyanate having on an average 2 to 6 isocyanate functionalities wherein said silane component comprises a silane polymer polymerized from about 30% to 95% by weight of ethylenically unsaturated non-silane containing monomers and about 5% to 70% by weight of ethylenically unsaturated silane containing monomers based on the weight of the silane polymer, said silane containing monomers selected from the group consisting of:

(a) a silane functional monomer having the structural formula (I):

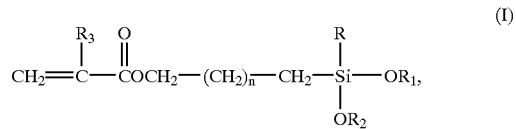

wherein R is $CH_3$, $CH_3CH_2$, $CH_3O$, or $CH_3CH_2O$; $R_1$ and $R_2$ are $CH_3$ or $CH_3CH_2$; and $R_3$ is H, $CH_3$, or $CH_3CH_2$; and n is 0 or a positive integer from 1 to 10;

(b) a silane functional monomer having the structural formula (II):

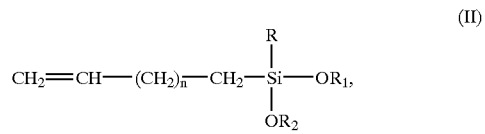

wherein R is $CH_3$, $CH_3CH_2$, $CH_3O$, or $CH_3CH_2O$; $R_1$ and $R_2$ are $CH_3$ or $CH_3CH_2$; and n is 0 or a positive integer from 1 to 10;

(c) a silane functional macromonomer having the structural formula (III):

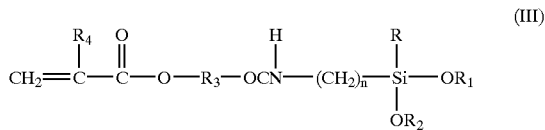

wherein R is $CH_3$, $CH_3CH_2$, $CH_3O$, or $CH_3CH_2O$; $R_1$ and $R_2$ are $CH_3$ or $CH_3CH_2$; $R_3$ is an alkylene group having 1 to 8 carbon atoms; $R_4$ is H or $CH_3$; and n is a positive integer from 1 to 8;

(d) acyloxysilane;

(e) vinylacetoxy silane; and a combination thereof.

23. The coating composition of claim 22 wherein said silane functional monomer of formula (I) is gamma-acryloxypropyltrimethoxy silane, gamma-methacryloxypropyltrimethoxy silane, gamma-methacryloxypropyltris(2-methoxyethoxy)silane, or a combination thereof.

24. The coating composition of claim 22 wherein said silane functional monomer of formula (II) is vinyltrimethoxy silane, vinyltriethoxy silane, vinyltris(2-methoxyethoxy)silane, or a combination thereof.

25. The coating composition of claim 22 wherein said silane polymer is polymerized from about 15 to 25% by weight styrene, about 30 to 60% by weight methacryloxypropyltrimethoxy silane, and about 25 to 50% by weight trimethylcyclohexyl methacrylate.

26. The clear coating composition of claim 22 wherein said silane polymer is polymerized from about 30% by weight styrene, about 50% by weight methacryloxypropyl trimethoxy silane, and about 20% by weight of nonfunctional acrylates, methacrylates or any mixtures thereof.

27. A coating composition comprising isocyanate, silane and melamine components wherein said isocyanate component comprises an aliphatic polyisocyanate having on an average 2 to 6 isocyanate functionalities, wherein said isocyanate component comprises 35 percent to 70 percent of said aliphatic polyisocyanate and 10 percent to 40 percent of said melamine component, all the percentages being based on total weight of composition solids.

28. A clear coating composition comprising isocyanate, silane and melamine components wherein said isocyanate component comprises an aliphatic polyisocyanate having on an average 2 to 6 isocyanate functionalities, said composition being in the form of a two-pack composition wherein a first-pack of said two-pack composition comprises said isocyanate component and a second-pack of said two-pack composition comprises said melamine and silane components.

29. A low VOC clear coating composition comprising isocyanate, silane and melamine components wherein said isocyanate component comprises an aliphatic polyisocyanate having on an average 2 to 6 isocyanate functionalities, said composition being in the form of a two-pack composition wherein a first-pack of said two-pack composition comprises said isocyanate component and a second-pack of said two-pack composition comprises said melamine and silane components.

30. A method of producing a clear coating on a substrate comprising:

applying a layer of a clear coating composition comprising isocyanate, silane and melamine components wherein said isocyanate component comprises an aliphatic polyisocyanate having on an average 2 to 6 isocyanate functionalities, wherein a VOC of said composition varies in the range of from 0.0 to 0.472 kilogram of an organic solvent per liter of the composition; and curing said layer into said clear coating.

31. The method of claim 30 wherein said coating has a DOI rating of at least 80.

32. The method of claim 30 wherein said coating has a 20° gloss of at least 80.

33. The method of claim 30 wherein said isocyanate functionalities of the polyisocyanate are blocked by reacting said polyisocyanate with a monomeric alcohol.

34. The method of claim 33 wherein said monomeric alcohol is cyclohexanol, 2-ethyl hexanol or a mixture thereof.

35. The method of claim 33 or 34 wherein said curing of said layer takes place at an elevated baking temperature in the range 80° C. to 160° C.

36. The method of claim 30 wherein said composition comprises in the range of from 5 percent to 45 percent of said silane component, all percentages being in weight percentages based on the total weight of composition solids.

* * * * *